United States Patent Office

3,497,484
Patented Feb. 24, 1970

3,497,484
UNIFORM CHLOROSTYRENE COPOLYMERS WITH CONJUGATED DIENES
Adel F. Halasa, Akron, and Charles J. Hunter, Cuyahoga Falls, Ohio, assignors to The Firestone Tire & Rubber Company, Akron, Ohio, a corporation of Ohio
No Drawing. Filed Nov. 13, 1967, Ser. No. 682,612
Int. Cl. C08d *3/02, 3/14*
U.S. Cl. 260—82.1                     8 Claims

ABSTRACT OF THE DISCLOSURE

A copolymer is produced by copolymerizing butadiene, isoprene, piperylene or 2,3-dimethylbutadiene with chlorostyrene or other chloro vinyl aromatic monomer, using a hydrocarbon lithium initiator. The vinyl monomer is substantially uniformly distributed along the polymer chain.

---

This invention relates to the copolymerization of ortho, meta, or para-chlorostyrene or other vinyl aromatic monomer in which chlorine is attached to the ring, or mixtures thereof, with a conjugated diene of 4 to 6 carbon atoms, namely, isoprene, 1,3-butadiene, piperylene or 2,3-dimethylbutadiene, using a hydrocarbon lithium initiator. The copolymers are new.

Such other vinyl aromatic monomers include alphamethyl styrene, vinyl toluene, vinyl naphthalene, etc. containing one or more chlorines in the ring.

The process is carried out in solution using a hydrocarbon lithium initiator, preferably an alkyllithium initiator containing 1 to 12 carbon atoms, e.g. n-butyllithium, as disclosed in British Patent 817,693, for instance, using a polar solvent and preferably a hydrocarbon solvent, such as hexane or heptane or a mixture thereof, or benzene. Other solvents which may be used include ether, tetrahydrofuran, dioxane, amines, etc. The disclosure of procedural steps in said patent, including usual polymerization temperatures, etc., is incorporated herein by reference. Such processes are well known and are used commercially. However, in the process of this invention, all of the initiator is usually added at the start of the polymerization.

Although copolymers of chlorovinyl aromatic monomers and conjugated dienes initiated by free radical processes are well known, copolymers of such monomers with conjugated dienes initiated by anionic processes are not known. This is because it is well known in organometallic chemistry that organolithium compounds are destroyed by halogenated materials such as allyl bromide, benzochloride, benzyl chloride, benzal chloride, diphenyl dichloromethane and chlorides activated by ketones or nitriles, etc., forming lithium halides. This reaction of the initiators with organic halides effectively prevents polymerization initiation.

It has been found, however, that the copolymerization of chlorostyrene, for instance, and conjugated dienes of 4 to 6 carbon atoms, alone or mixtures thereof in solution, initiated by n-butyllithium or other hydrocarbon lithium initiator, is so rapid that it is possble to complete the polymerization reaction before the action of the initiator can be terminated by reaction with the halogen groups from the chlorostyrene. It is surprising that the polymerization of a chlorostyrene with such a conjugated diene takes place so rapidly that a high molecular weight rubbery copolymer of the chlorostyrene can be formed.

The high reactivity of the chlorostyrenes, etc. with the lithium initiator system makes it possible to prepare such a copolymer wherein the chlorostyrene appears substantially uniformly along the chain upon simple addition of initiator to a mixture of the monomers. This is in contrast to copolymers of these conjugated dienes with the less reactive vinyl aromatics, such as styrene, wherein the styrene appears largely as a block at one or both ends of the polymer chain when prepared under similar conditions.

Copolymers of styrene with conjugated dienes, such as isoprene and butadiene, prepared with the use of a hydrocarbon lithium initiator are somewhate deficient for body stocks in tire manufacture because of poor tack and green strength compared to natural rubber. It has been found that a copolymer of isoprene with small amounts of chlorostyrene, using a hydrocarbon lithium initiator, gives a product having better tack and green strength than polyisoprene. The same is true of copolymers of chlorostyrene and the other conjugated dienes of 4 to 6 carbon atoms compared to homopolymers. Thus the new copolymers are valuable rubbers to be used alone or in admixture with other rubbers in the manufacture of a great variety of products, including tires, hose, industrial rubber goods, etc.

The amount of the chlorostyrene required to improve the tack and green strength of isoprene, or to reduce the cold flow (as disclosed in French Patent 1,473,926) is so small that the nature of the location of the vinyl monomer in the polymer (i.e. whether it is distributed substantially uniformly along the chain or forms a terminal block) cannot be determined and, furthermore, there is no real difference in the properties of the copolymers in which the styrene is distributed substantially uniformly along the polymer chain and block copolymers containing such small amounts of styrene. The invention pertains to those copolymers which contain at least about one per cent by weight, and preferably at least about 15 to 35 percent by weight of the vinyl monomer. Copolymers of such a larger content of vinyl monomer, have importantly different properties depending upon whether the vinyl units are substantially uniformly distributed or are in terminal blocks. The upper limit of the vinyl content may be 80 percent by weight. Copolymers containing as much as 25 parts by weight of chlorostyrene or other vinyl aromatic units in 100 parts of copolymer thereof with a conjugated diene of 4 to 6 carbon atoms, with substantially uniform distribution thereof along the polymer chain, derived from a chloro vinyl aromatic monomer of this invention can be reacted at a lower copolymerization temperature, e.g. lower than $-20°$ C. The copolymers in which the vinyl monomer is distributed substantially uniformly along the polymer chain have lower glass transition temperatures (Tg) than copolymers of the same equivalent weight ratio of conjugated diene and vinyl units but a high content of polystyrene blocks, and therefore wear much better.

The invention is illustrated by experiments summarized in the following tables.

In the experiments reported in Table I, a mixture of o- and p-chlorostyrenes was used. n-Butyllithium (BuLi)

was used as catalyst, and the polymerization was conducted for 8 hours at 135° F.

TABLE I

| Samples | A | B | C | D | E |
|---|---|---|---|---|---|
| Polymerization charge: | | | | | |
| o-, p-Chlorostyrene, grams | 91.0 | 91.0 | 91.0 | 45.0 | 45.0 |
| Butadiene-1,3, grams | 362.0 | 362.0 | 362.0 | 400.0 | 400.0 |
| BuLi, mmoles, phm | 9.0 | 15.0 | 15.0 | 30.0 | 30.0 |
| Polymer: | | | | | |
| o-, p-Chlorostyrene present,[1] percent | 15.5 | 20.2 | 19.0 | 11.25 | 11.25 |
| Yield, grams | 420 | 420 | 415 | 405 | 415 |
| Block chlorostyrene present | None | None | None | None | None |
| 1,2-structure present, percent | 9 | 9 | 9 | | |
| Properties of polymer: | | | | | |
| Mooney, ML at 212° F | 151 | 88 | 88 | 16 | 22 |
| DSV [2] | 4.2 | 2.15 | 2.15 | 1.26 | 1.34 |
| Gel | 12.3 | None | None | None | 5.72 |

[1] Determined by infra-red.
[2] Dilute solution viscosity. ASTM, D 1601-61. Part 27, June 1967, Page 531.

The polymers reported in Table I were blended, using equal parts of one of the high Mooney polymers of Table I with the low Mooney polymer their identified as sample D. The blends are identified in Table II by the letters used in identifying the several polymers. The blends were cured by a usual black tread stock test formula. The properties are recorded in Table II. The Mooneys of the cured stocks are recorded as ML/4 at 212° F. Modulus, tensile strength and elongation values are given for stocks cured for different lengths of time, as indicated.

TABLE II

| Blend | Control | C, D | B, D | A, D |
|---|---|---|---|---|
| ML/4 at 212° F | | 73 | 73 | 120 |
| Green strength: | | | | |
| Peak | 2.50 | 2.25 | 1.62 | 2.15 |
| Break | 2.38 | 1.90 | 0.5 | 1.00 |
| Elongation | 138 | 933 | 680 | 600 |
| 300% modulus: | | | | |
| 10 min | 325 | 500 | 375 | 400 |
| 15 min | 725 | 700 | 650 | 750 |
| 23 min | 900 | 750 | 725 | 900 |
| 30 min | 975 | 725 | 800 | 925 |
| Tensile strength: | | | | |
| 10 min | 2,125 | 875 | 825 | 1,075 |
| 15 min | 2,825 | 1,200 | 1,250 | 1,450 |
| 23 min | 2,950 | 1,200 | 1,475 | 1,825 |
| 30 min | 2,850 | 1,400 | 1,400 | 1,625 |
| Elongation, percent: | | | | |
| 10 min | 925 | 450 | 440 | 520 |
| 15 min | 700 | 440 | 440 | 444 |
| 23 min | 640 | 420 | 460 | 440 |
| 30 min | 630 | 420 | 420 | 420 |
| Young's modulus index (deg.) | −51 | −60 | −60 | −60 |

Isoprene was copolymerized with a mixture of o- and p-chlorostyrene in hexane at 50° C. for 16 hours, using n-butyllithium (BuLi) as catalyst. Several of the runs are summarized in Table III.

TABLE III

| Sample | Control | F | G |
|---|---|---|---|
| Polmerization charge: | | | |
| o- and p-Chlorostyrene, wt. percent | None | 30.0 | 11.0 |
| Isoprene, wt. percent | 100 | 70.0 | 89.0 |
| BuLi, mmoles, phm | 0.179 | 0.529 | 0.179 |
| Conversion, yield wt. percent | 90 | 90 | 100 |
| Polymer: | | | |
| o- and p-Chlorostyrene, wt. percent by— | | | |
| (a) NMR | | 39.87 | |
| (b) Chemical analysis | | 35.44 | 11.0 |
| Block chlorostyrene present, wt. percent by— | | | |
| (a) NMR | None | None | None |
| (b) Oxidation | None | None | 2.20 |

We claim:
1. The process of producing a copolymer composed of (1) units of a conjugated diene containing 4 to 6 carbon atoms, and (2) 1 to 80 percent by weight of units of a chloro vinyl aromatic monomer substantially uniformly distributed in the resulting diene polymer which process comprises copolymerizing the conjugated diene with a vinyl aromatic monomer containing chlorine attached to the ring, in hydrocarbon solution using a hydrocarbon lithium initiator.

2. The process of claim 1 in which the conjugated diene is butadiene.

3. The process of claim 1 in which the conjugated diene is isoprene.

4. The process of claim 1 in which the initiator is an alkyllithium.

5. The process of claim 1 in which the initiator is n-butyllithium.

6. The process of claim 1 in which the chloro vinyl aromatic monomer is a chlorostyrene or mixture of chlorostyrenes.

7. The process of claim 1 in which the chlorine-containing vinyl aromatic monomer is one or more chlorostyrenes in an amount equal to substantially 15 to 35 percent by weight of the polymer and the initiator is an alkyllithium containing 1 to 12 carbon atoms.

8. The process of claim 1 in which all of the initiator and the monomers are added at the start of the polymerization.

References Cited

UNITED STATES PATENTS 3,224,994 12/1965 Lundberg et al. ____ 260—30.6
3,366,611 1/1968 Wofford _____ 260—84.7

JOSEPH L. SCHOFER, Primary Examiner

J. C. HAIGHT, Assistant Examiner

U.S. Cl. X.R.

260—80.7, 87.5, 91.5